(12) United States Patent
Lee et al.

(10) Patent No.: US 6,568,110 B2
(45) Date of Patent: May 27, 2003

(54) NONROTATING BILLBOARD OF ROTATION BODY

(75) Inventors: Jun Yong Lee, Yeoju-gun (KR); Gi Seob Uhm, Yeoju-gun (KR)

(73) Assignee: Dong In Tec Co., Ltd. (KR)

( * ) Notice: Subject to any disclaimer, the term of this patent is extended or adjusted under 35 U.S.C. 154(b) by 0 days.

(21) Appl. No.: 10/059,821

(22) Filed: Jan. 29, 2002

(65) Prior Publication Data

US 2002/0152657 A1 Oct. 24, 2002

(30) Foreign Application Priority Data

Apr. 20, 2001 (KR) .................................. 2001-0021508

(51) Int. Cl.[7] .............................................. G09F 21/04
(52) U.S. Cl. ........................................................ 40/587
(58) Field of Search .................. 40/587, 426; 301/37.25

(56) References Cited

U.S. PATENT DOCUMENTS

| | | | | |
|---|---|---|---|---|
| 4,280,293 A | * | 7/1981 | Kovalenko et al. ........... | 40/587 |
| 4,388,771 A | * | 6/1983 | Lalonde ....................... | 40/587 |
| 5,316,376 A | * | 5/1994 | Defreitas ..................... | 40/587 |
| 5,490,342 A | * | 2/1996 | Rutterman et al. ........... | 40/587 |
| 6,120,104 A | * | 9/2000 | Okamoto et al. ............. | 40/587 |

\* cited by examiner

*Primary Examiner*—Gary Hoge
(74) *Attorney, Agent, or Firm*—Harness, Dickey & Pierce, P.L.C.

(57) ABSTRACT

The present invention relates to a nonrotating billboard of a rotation body which is attached on a surface of a rotation center of a vertical rotation member such as vehicle wheel, fan, etc. for showing a nonrotating state of a pattern, emblem or advertisement irrespective of a rotation of a rotation body. The nonrotating billboard includes a housing rotated together with the rotation member, a billboard member having a surface on which a billboard is formed installed in the housing and rotatable relative thereto while maintaining an upright state through use of a weight member. The nonrotating billboard further includes a friction prevention unit for maintaining a free state of the billboard member such that the billboard is restricted from contacting the housing.

2 Claims, 4 Drawing Sheets

NONROTATING BILLBOARD OF ROTATION BODY

BACKGROUND OF THE INVENTION

1. Field of the Invention

The present invention relates to a nonrotating billboard of a rotation body, and in particular to a nonrotating billboard of a rotation body which is attached on a surface of a rotation center of a vertical rotation member such as vehicle wheel, fan, etc. for thereby showing a nonrotating state of a pattern, emblem or advertisement irrespective of a rotation of a rotation body.

2. Description of the Background Art

A cover is attached to the surface of a rotation body engaged to a rotary shaft such as a vehicle wheel, fan, etc. for thereby covering fixtures such as a bolt for fixing the rotation body to the rotary shaft, so that it is possible to implement a better outer appearance of the rotation body.

A certain pattern, character or advertisement of a company is protruded on the surface of a cover of the rotation body or a certain printed matter is attached thereon for thereby advertising a company. In particular, in the case of a wheel cover attached to the vehicle wheel, the fixture capable of fixing the wheel is covered, and the outer appearance of the wheel is integral with respect to the outer appearance of the body, so that it is possible to implement a better outer appearance of the vehicle.

Since the above rotation body cover does not receive a direct load from the rotary shaft, the rotation body cover is formed of a light material such as a synthetic resin material or aluminum.

Since the conventional cover attached to the rotation body such as a wheel cover of a vehicle or a fan cover of a fan is attached to the rotation body and is integrally rotated with the rotation body, when the rotation body is rotated, it is impossible to recognize a certain pattern(or advertisement) formed on the surface of the same.

In the case of the conventional vehicle wheel cover, a certain billboard such as an emblem of a vehicle fabrication company is protrudely formed on the surface of the same. When the vehicle runs, since the billboard is rotated at a high speed together with the wheel, it is impossible to recognize the billboard. Therefore, the billboard is visible only when the vehicle is stopped.

The Korean Utility Model No. 2000-7039 discloses "Nonrotating wheel cover" for overcoming the problems of the conventional vehicle wheel cover.

The nonrotating wheel cover includes a balance weight below the center and is fixed to a hub of a wheel by a fixing unit which includes a lubrication unit formed of a carbonic rotation friction material and a ceramic fixing friction material. Therefore, in the case that the wheel is rotated, the wheel cover is not rotated by the balancing operation of the balancing weight and the lubrication operation of the lubrication unit, so that the billboard such as an emblem or advertisement protruded on or attached to the surface of the same is visible.

However, when the vehicle moves, the conventional nonrotating wheel cover does not maintain a fully stopped state due to a limitation in a lubricating operation of the lubrication unit, an air resistance flown over the surface, or because the wheel cover is severely moved in the forward or backward direction. In any or all of the foregoing situations, the wheel cover is rotated together with the wheel, thereby hampering visibility of the billboard. Therefore, in the above conventional wheel cover, it is impossible to implement a clear billboard state of the advertisement on the surface.

SUMMARY OF THE INVENTION

Accordingly, it is an object of the present invention to provide a nonrotating billboard of a rotation body which overcomes the problems encountered in the conventional art.

It is another object of the present invention to provide a nonrotating billboard of a rotation body which is attached to a surface of a rotation body such as a vehicle wheel or a fan that is capable of covering the inner fixtures and implementing a clear state of a billboard such as an emblem or an advertisement formed on the surface of the same even when the rotation body is rotated.

To achieve the above objects, there is provided a nonrotating billboard of a rotation member which includes a housing attached to a center of a rotation body and rotated together with the rotation member, a billboard member which has a surface on which a billboard is formed and includes a weight member below the weight center and is installed in the housing based on a relative rotation method and maintains an upright state by the weight of the weight member, and a friction prevention unit for maintaining a free state of the billboard member from the housing in a nonrotating state by preventing the billboard member from being contacted with the housing.

There is further provided a cover which covers the billboard member in such a manner that a billboard is exposed to the outside and is contacted with the housing and protects the billboard member.

The friction prevention unit includes a plurality of magnetic strips which are attached to each surrounding portion of the housing, billboard member and cover in such a manner that the same poles of the magnetic strips are opposite to each other for generating a repulsive force with respect to each other, so that the billboard member does not contact the housing and the cover.

The billboard member is relatively rotatable with respect to the housing in such a manner that a through hole formed in the center portion of the same is inserted onto a fixing pin installed in the center portion of the housing.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The construction and operation of each element of a nonrotating billboard attached to a rotation body according to the present invention will be explained with reference to the accompany drawings.

Figure 1:
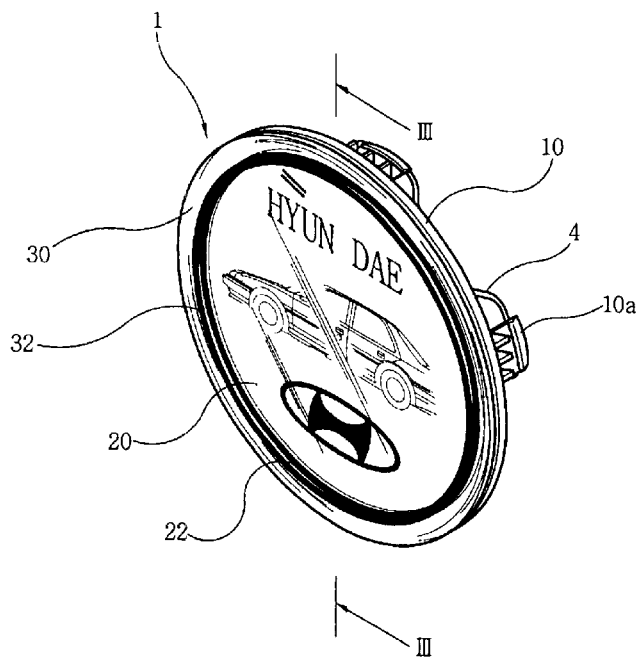
FIG. 1 is a perspective view illustrating a nonrotating billboard attached to a rotation body according to an embodiment of the present invention.
Figure 2:
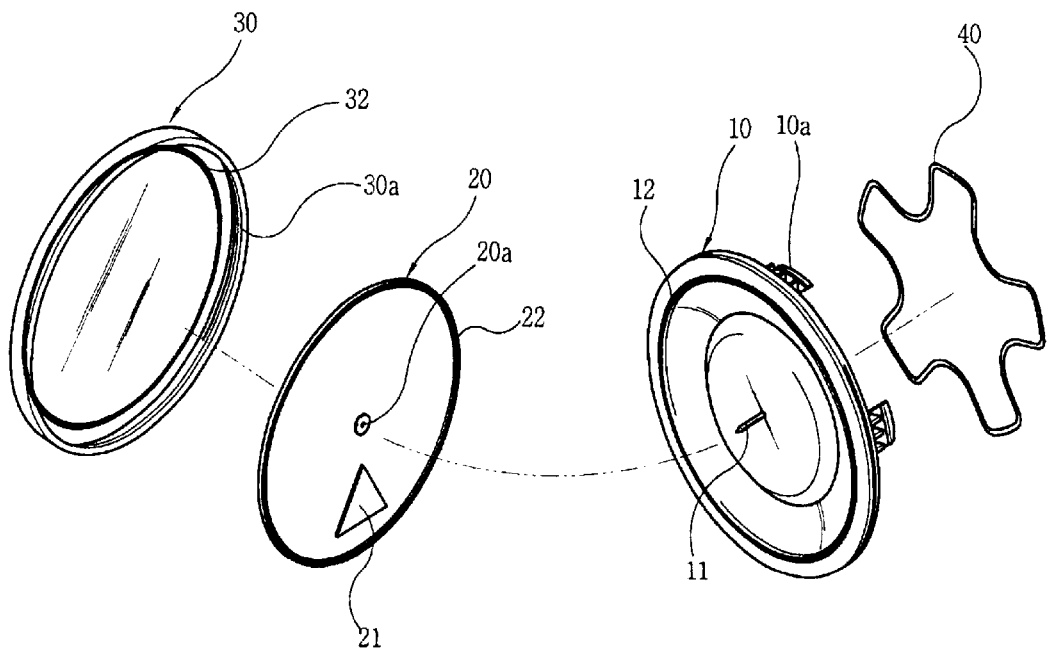
FIG. 2 is a disassembled perspective view illustrating a nonrotating billboard attached to a rotation body according to an embodiment of the present invention.
Figure 3:
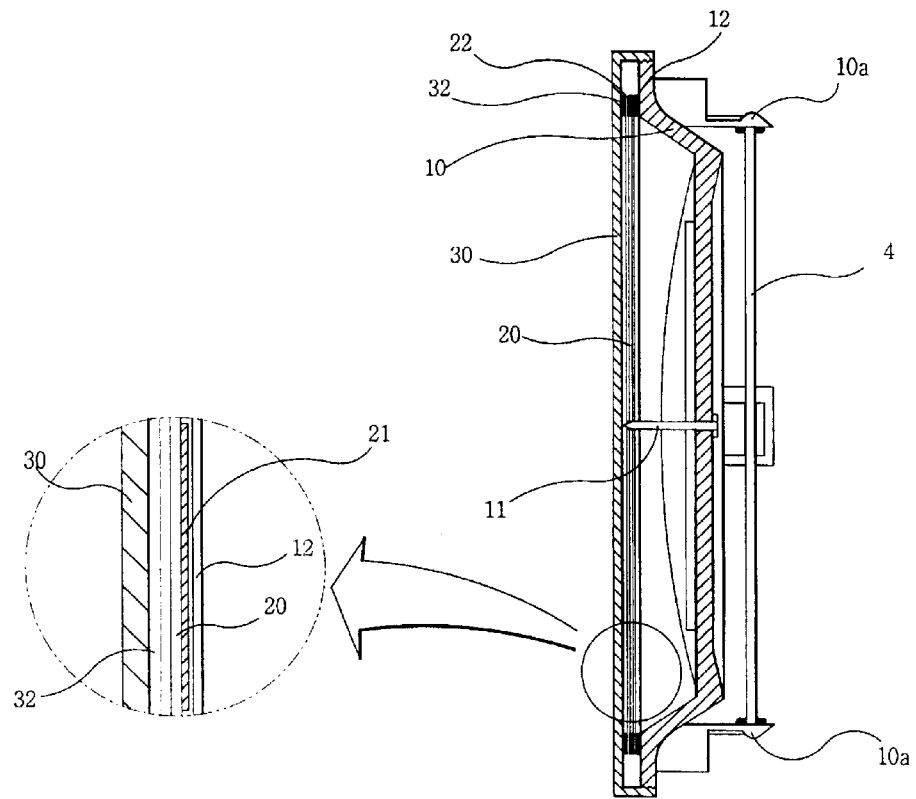
FIG. 3 is a cross-sectional view taken along line III—III of FIG. 1.
Figure 4:
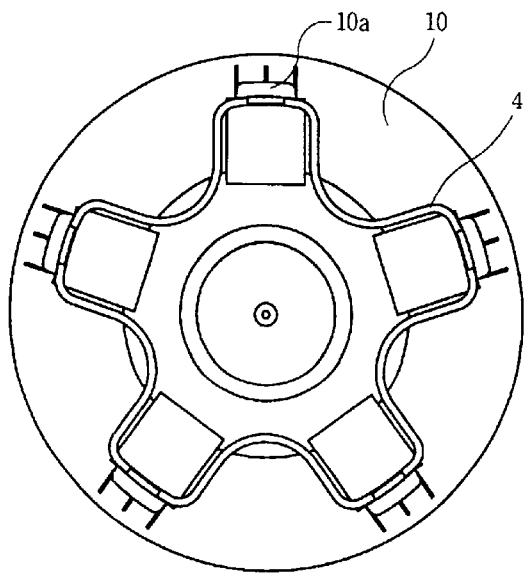
FIG. 4 is a back view of FIG. 1.
Figure 5:
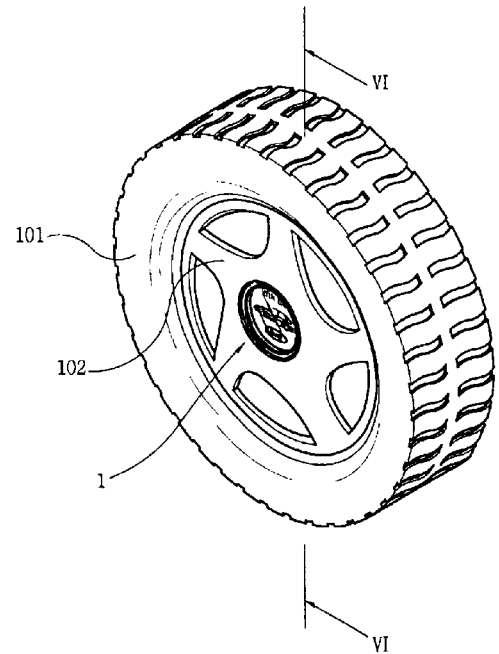
FIG. 5 is a perspective view illustrating a vehicle wheel having a nonrotating billboard attached to a rotation body according to an embodiment of the present invention.
Figure 6:
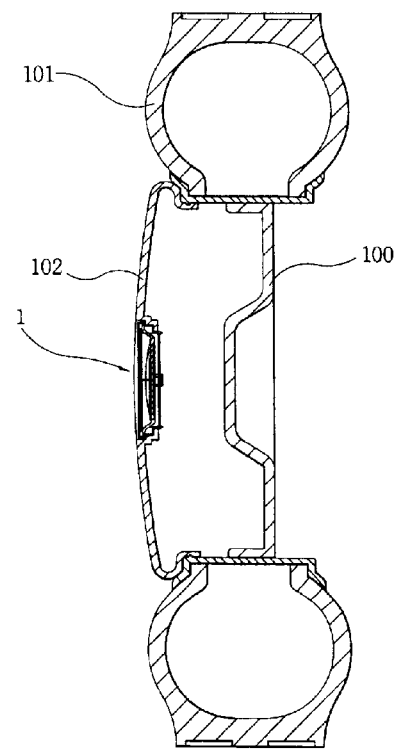
FIG. 6 is a cross-sectional view taken along line VI—VI of FIG. 5.
Figure 7:
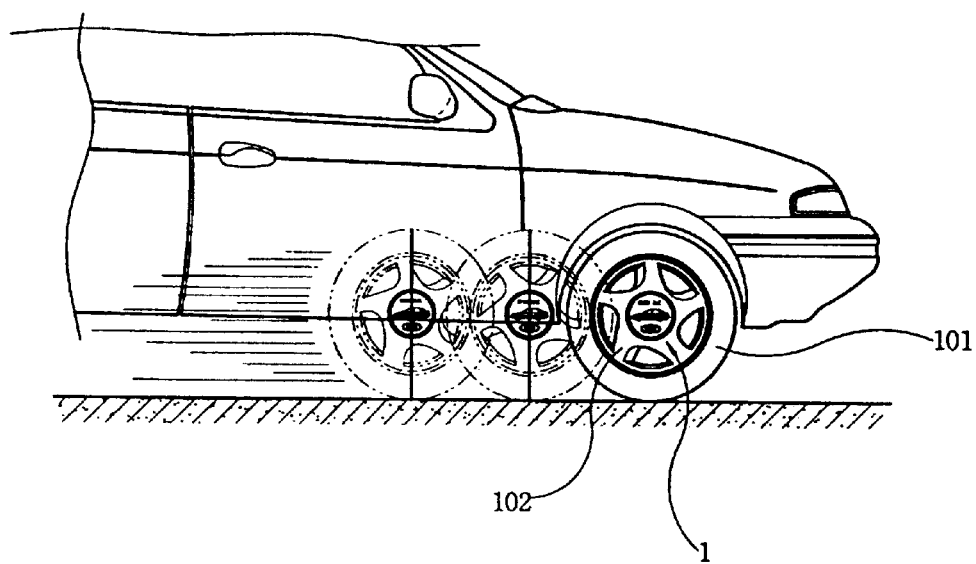
FIG. 7 is a view illustrating a state of a use of a nonrotating billboard attached to a rotation body according to an embodiment of the present invention.

FIG. 1 is a perspective view illustrating a nonrotating billboard attached to a rotation body according to an embodiment of the present invention, FIG. 2 is a disassembled perspective view illustrating a nonrotating billboard attached to a rotation body according to an embodiment of the present invention, FIG. 3 is a cross-sectional view taken along line III—III of FIG. 1, FIG. 4 is a back view of FIG. 1, FIG. 5 is a perspective view illustrating a vehicle wheel having a nonrotating billboard attached to a rotation body according to an embodiment of the present invention, FIG. 6 is a cross-sectional view taken along line VI—VI of FIG. 5, and FIG. 7 is a view illustrating a state of a use of a nonrotating billboard attached to a rotation body according to an embodiment of the present invention.

As shown in FIGS. 1 and 2, the nonrotating billboard is attached to a rotation member according to an embodiment of the present invention, whereby the nonrotating billboard includes a circular housing 10 having a concave center portion, a billboard member 20 having a center portion rotatably attached to a fixing pin 11 which is fixed to the center of the housing 10, and a cover 30 which surrounds the billboard member 20 and contacts with the housing 10.

The housing 10 is formed of a circular synthetic resin having a concave front surface attached to the center of the rotation body (not shown) such as a vehicle wheel or a fan. As shown in FIGS. 2 and 3, the fixing pin 11 is installed in the center of the housing 10. A plurality of fixtures 10a are installed around the center of the back surface for fixing the housing 10 to the rotation member. A circular magnetic strip 12 is attached to the surrounding portion of the front surface. The housing 10 is fixed to the rotation body in such a manner that the fixtures 10a are inserted into a fixing structure (not shown) of the rotation body, whereby the housing 10 is rotated integrally with the rotation body. As shown in FIG. 4, a star shaped elastic support member 40 is inserted into the interiors of the fixtures 10a of the back surface of the housing 10 for thereby increasing the bending strength in such a manner that the fixtures 10a support each other. The fixtures 10a and the elastic support member 40 are formed for engaging the housing 10 to the rotation body. The structures of the fixtures 10a and the elastic support member 40 may be modified in various form based on the structure and shapes of the rotation body (not shown).

The billboard member 20 is formed of a circular plate having a front surface on which a billboard such as an emblem, pattern or advertisement billboard is protruded or the printed matter of the same is attached. As shown in FIG. 2, a through hole 20a formed in the center of the billboard member 20 is inserted onto a fixing pin 11 of the housing 10 for implementing a relative rotation with respect to the housing 10. A magnetic strip 22 is attached in the surrounding portions of the billboard member 20 for generating a repulsive force based on the same poles with respect to the magnetic strip 12 attached to the surrounding portions of the front surface of the housing 10 and the magnetic strip 32 attached to the surrounding portions of the back surface of the cover 30. A weight member 21 is installed below the rotation center of the center portion of the back surface for implementing a vertical state of the billboard member 20 based on a vertical state by the weight. The billboard member 20 is distanced from the front surface of the housing 10 and the back surface of the cover 30 by the repulsive forces of the magnetic strips 12, 22 and 32, so that the billboard member 20 always maintains an upright state by the weight of the weight member 21 irrespective of the rotation of the housing 10 and the cover 30 which are rotated integrally with the rotation body.

As shown in FIGS. 3 and 4, the cover 30 covers the front surface of the billboard member 20 and is formed of a circular transparent synthetic resin material engaged to the housing 10 by the bolt method. The magnetic strip 32 is attached along the surrounding portions of the back surface and is opposite with the magnetic strip 22 of the billboard member 20 based on the same pole. The cover 30 is rotated together with the housing 10 which is integrally rotated with the rotation body and surrounds the billboard member 20 for exposing the billboard to the outside, protecting the billboard from an external impact, shielding the air which flows the surrounding portions and preventing a resistance of the air. The magnetic strip 32 of the back surface of the cover 30 generates a repulsive force with respect to the magnetic strip 12 attached to the housing 10 and the magnetic strip 22 of the billboard member 20, so that the billboard member 20 is distanced from the housing 10 and the cover 30 for preventing friction with respect to the housing 10 and the cover 30.

In one embodiment, the nonrotating billboard is attached to the rotation member which is engaged to the wheel of the vehicle, as shown in FIGS. 5 & 6. The nonrotating billboard is fixedly attached to the wheel 100 of the vehicle by the fixtures 10a installed in the back surface of the housing 10. Therefore, when the vehicle is parked or stopped, the wheel 100 is stopped and the billboard member 20 maintains an upright state by the weight of the weight member 21 irrespective of the inclination of the housing 10 or the cover 30, so that it is possible to implement a upright state of the billboard such as an advertisement or emblem attached on the billboard member 20. In addition, upon movement of the vehicle, the wheel 100 is rotated, the housing 10 and the cover 30 are rotated together with the wheel 100, but the billboard member 20 does not rotate therewith as the billboard member 20 is distanced between the housing 10 and the cover 30 by a repulsive force of the magnetic strips 12, 22 and 32 such that the billboard member 20 is uprightly installed by the operation of the weight member 21. Therefore, the billboard member 20 does not contact the surfaces of the housing 10 and the cover 30 and does not move due to any effect of the air based on the shielding operation of the cover 30 when the vehicle moves. Therefore, it is possible to implement a stopped state of the billboard member 20. As shown in FIG. 7, while the vehicle is moving, the billboard, such as an advertisement or emblem attached on the billboard member 20, is visible in a nonrotating state through the transparent cover 30.

In the nonrotating billboard attached to the rotation body according to the present invention, the billboard such as an emblem, pattern or advertisement attached on the billboard member always maintains an upright state even when the rotation body is stopped or the rotation body is rotated at a high speed, so that the nonrotating billboard is visible to the outside in a nonrotating state.

Reference numeral 101 of FIGS. 5 and 6 represents a tire.

As described above, the nonrotating billboard attached to the rotation body according to the present invention is attached to the surface of the rotation body such as a vehicle wheel or a fan. The billboard such as a pattern or advertisement formed in the billboard member or an emblem of a fabrication company is clearly seen from the outside irrespective of the rotation of the rotation body. Therefore, in the case that the nonrotating billboard is attached to the products having the rotation member such as a vehicle wheel or a fan, it is possible to implement a better outer appearance of the rotation member for thereby increasing the reliability of the product. In particular, in the case that the nonrotating billboard is attached to the wheels of a taxi or bus, it is possible to enhance an advertising effect.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The disclosure in Korean application No. 2001-21508 filed Apr. 20, 2001 is hereby incorporated by reference.

What is claimed is:

1. A nonrotating billboard of a rotation body, comprising:

a housing attached to a center of a rotation body and rotated together with the rotation body;

a billboard member which has a surface on which a billboard is formed and includes a weight member below the weight center and is installed in the housing based on a relative rotation method and maintains an upright state by the weight of the weight member;

a cover which covers the billboard member in such a manner that a billboard is exposed to the outside and is contacted with the housing and protects the billboard member; and a friction prevention means for maintaining a free state of the billboard member from the housing in a nonrotating state by preventing the billboard member from being contacted with the housing, the friction prevention means including a plurality of magnetic strips which are attached to each surrounding portion of the housing, billboard member, and cover in such a manner that the same poles of the magnetic strips are opposite to each other for thereby generating a repulsive force with respect to each other, so that the billboard member does not contact the housing and cover.

2. The billboard of claim 1, wherein the billboard member is rotatable relative to the housing in such a manner that a through hole formed in the center portion of the billboard is inserted onto a fixing pin installed in the center portion of the housing.

* * * * *